(12) United States Patent
Sirin et al.

(10) Patent No.: US 11,555,974 B2
(45) Date of Patent: Jan. 17, 2023

(54) FIRE RESISTANT FIBER OPTIC CABLE

(71) Applicant: Prysmian S.p.A., Milan (IT)

(72) Inventors: Zekeriya Sirin, Milan (IT); Baris Soenmez, Milan (IT); Can Altingoez, Milan (IT)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 16/965,584

(22) PCT Filed: Jan. 29, 2018

(86) PCT No.: PCT/EP2018/052046
§ 371 (c)(1),
(2) Date: Jul. 28, 2020

(87) PCT Pub. No.: WO2019/145046
PCT Pub. Date: Aug. 1, 2019

(65) Prior Publication Data
US 2021/0048591 A1    Feb. 18, 2021

(51) Int. Cl.
*G02B 6/44* (2006.01)

(52) U.S. Cl.
CPC ......... *G02B 6/4436* (2013.01); *G02B 6/4434* (2013.01)

(58) Field of Classification Search
CPC .. G02B 6/4436; G02B 6/4432; G02B 6/4494; G02B 6/4434; G02B 6/4435; G02B 6/4496
See application file for complete search history.

(56) References Cited

U.S. PATENT DOCUMENTS

| 5,390,273 | A | 2/1995 | Rahman et al. | |
|---|---|---|---|---|
| 6,640,033 | B2* | 10/2003 | Auvray | G02B 6/4436 385/109 |
| 2003/0123821 | A1* | 7/2003 | Risch | G02B 6/4494 385/100 |
| 2005/0244116 | A1* | 11/2005 | Evans | H01B 7/328 385/100 |

(Continued)

FOREIGN PATENT DOCUMENTS

| CN | 203385911 U | 1/2014 |
|---|---|---|
| CN | 204405907 U | 6/2015 |

(Continued)

OTHER PUBLICATIONS

ASTM International, "Standard Test Method for Dropping Point of Lubricating Grease," Designation: D 566-02, 2002, 5 pages.

(Continued)

*Primary Examiner* — Sung H Pak
*Assistant Examiner* — Hoang Q Tran
(74) *Attorney, Agent, or Firm* — Slater Matsil, LLP

(57) ABSTRACT

Disclosed is an armored fire resistant fiber optic cable including a core comprising a central strength member, and a plurality of buffer tubes arranged around said central strength member, each buffer tube containing a plurality of optical fibers; a first mica layer arranged around the core; an inner sheath surrounding the first mica layer; a metal wire armor surrounding the inner sheath; and an outer sheath surrounding and in direct contact with the metal wire armor, wherein a second mica layer surrounds the inner sheath and the metal wire armor surrounds the second mica layer.

23 Claims, 2 Drawing Sheets

(56) References Cited

U.S. PATENT DOCUMENTS

| | | | | |
|---|---|---|---|---|
| 2013/0170800 A1* | 7/2013 | Consonni | ............ | G02B 6/4433 |
| | | | | 385/100 |
| 2014/0023330 A1* | 1/2014 | Blew | .................... | G02B 6/4436 |
| | | | | 385/113 |
| 2015/0131952 A1 | 5/2015 | Gallo et al. | | |
| 2015/0177471 A1* | 6/2015 | Bringuier | ............ | G02B 6/4494 |
| | | | | 385/103 |
| 2016/0377825 A1* | 12/2016 | Bringuier | ............ | G02B 6/4434 |
| | | | | 385/113 |
| 2018/0231729 A1* | 8/2018 | Baetz | .................. | G02B 6/4436 |
| 2018/0348460 A1* | 12/2018 | Sahoo | .................. | G02B 6/4494 |
| 2019/0101715 A1* | 4/2019 | Hudson, II | ........... | G02B 6/4434 |

FOREIGN PATENT DOCUMENTS

| | | | | |
|---|---|---|---|---|
| CN | 105842800 A | 8/2016 | | |
| EP | 1426804 A2 | 6/2004 | | |
| EP | 1956404 A1 | 8/2008 | | |
| EP | 1257861 B1 | 7/2010 | | |
| IN | 201721018968 | * | 5/2017 | .............. G02B 6/44 |
| WO | 2007049090 A1 | 5/2007 | | |
| WO | 2015200262 A1 | 12/2015 | | |

OTHER PUBLICATIONS

ASTM International, "Standard Test Method for Measuring the Minimum Oxygen Concentration to Support Candle-Like Combustion of Plastics (Oxygen Index)," D2863-12, Dec. 2012, 14 pages.
Caledonian Cables Ltd, "Fire resistant Multi Loose Tube Fiber Optic Cables," Nov. 2016, 6 pages.

* cited by examiner

FIRE RESISTANT FIBER OPTIC CABLE

CROSS-REFERENCE TO RELATED APPLICATIONS

This application is a national stage of International Application No. PCT/EP2018/052046, filed on Jan. 29, 2018, which application is hereby incorporated herein by reference in its entirety.

TECHNICAL FIELD

The present disclosure relates to the field of optical cables suitable for operating during a fire and thereafter. In particular, the present disclosure relates to a fire resistant fiber optic cable.

BACKGROUND

In certain applications, optical cables should be able to withstand fire without significantly decreasing of their transmission performance. For instance, cables used in fire alarm systems and/or local video surveillance should be able to continue to transmit data/signals in the presence of fire.

US 2015/0131952 discloses a fire resistant optical communication cable. The cable comprises a plurality of core elements including bundles of optical fibers located within tubes arranged around a central strength member formed from glass-reinforced plastic. A layer located outside of and surrounding the elements of core may be a fire retardant tape such as mica tape. An armor layer may be located outside of the fire retardant layer. A plurality of particles of an intumescent material is embedded within the material of cable jacket.

FIREFLIX catalogue of Caledonian Cables Ltd (2016, page 30) discloses, inter alia, a fire resistant armoured fiber optic cable comprising a central loose tube containing 2-24-fibers, filled with water-blocking gel, said tubes being collectively wrapped with a fire blocking mica glass tape. Fiber glass is wound around the tube to provide physical protection and tensile strength, with added fire protection. The cable can be jacketed with a thermoplastic LSZH (low smoke zero halogen) inner sheath. Around said inner sheath, a single layer of galvanized steel wire braid or armor or a corrugated steel armor is applied surrounded, in turn, by an outer LSZH sheath.

FIREFLIX catalogue of Caledonian Cables Ltd (2016, page 35) discloses, inter alia, a fire resistant armoured fiber optic cable comprising from 5 to 36 fiber containing tubes, stranded around a central strength member. The central strength member can be made of glass fiber reinforced plastics. Each tube contains from 4 to 12 fibers and is filled with a water-blocking gel. The tubes are individually wound with fire blocking mica glass tape. The jelly filled tube is water-blocked by using swellable tape and thread. The cable is jacketed with an inner sheath in thermoplastic material LSZH, around which a single layer of galvanized steel wire braid or armor or a corrugated steel armor is applied surrounded, in turn, by an outer LSZH sheath.

WO 2015/200262 relates to an optical communication cable comprising a cable jacket made from a LSZH polyethylene and a central bore containing bundles of optical fibers located within buffer tubes arranged around a central support rod formed from a material such as glass-reinforced plastic or metal. An armor layer is wrapped around the interior elements and is formed from a corrugated sheet of steel. A crack resisting and/or adhesion barrier layer is located between armor layer and cable jacket. The adhesion barrier may be formed from mica.

SUMMARY

In one embodiment, a fiber optic cable comprises a core comprising a central strength member, and a plurality of buffer tubes arranged around the central strength member. Each of the plurality of buffer tubes contain a plurality of optical fibers. A first mica layer is arranged around the core. An inner sheath surrounds the first mica layer. A metal wire armor surrounds the inner sheath. An outer sheath surrounds and in direct contact with the metal wire armor. A second mica layer surrounds the inner sheath, and the metal wire armor surrounds the second mica layer, where the fiber optic cable is a fire resistant fiber optic cable.

In one embodiment, a fiber optic cable comprises a central strength member and a plurality of buffer tubes arranged around the central strength member. Each of the plurality of buffer tubes comprising a plurality of optical fibers. A first mica layer is disposed over the central strength member, the plurality of buffer tubes being disposed in an annular region between the first mica layer and the central strength member. A first protecting layer surrounds, and physically contacts with, the first mica layer. A first sheath surrounds the first protecting layer and second mica layer surrounds the first sheath. A metal wire armor surrounds the second mica layer, and a second sheath surrounds and physically contacts the metal wire armor, where the fiber optic cable is a fire resistant fiber optic cable.

BRIEF DESCRIPTION OF THE DRAWINGS

The present disclosure will become fully clear after reading the following detailed description, given by way of example and not of limitation, with reference to the attached wherein.

DETAILED DESCRIPTION OF ILLUSTRATIVE EMBODIMENTS

Figure 1:
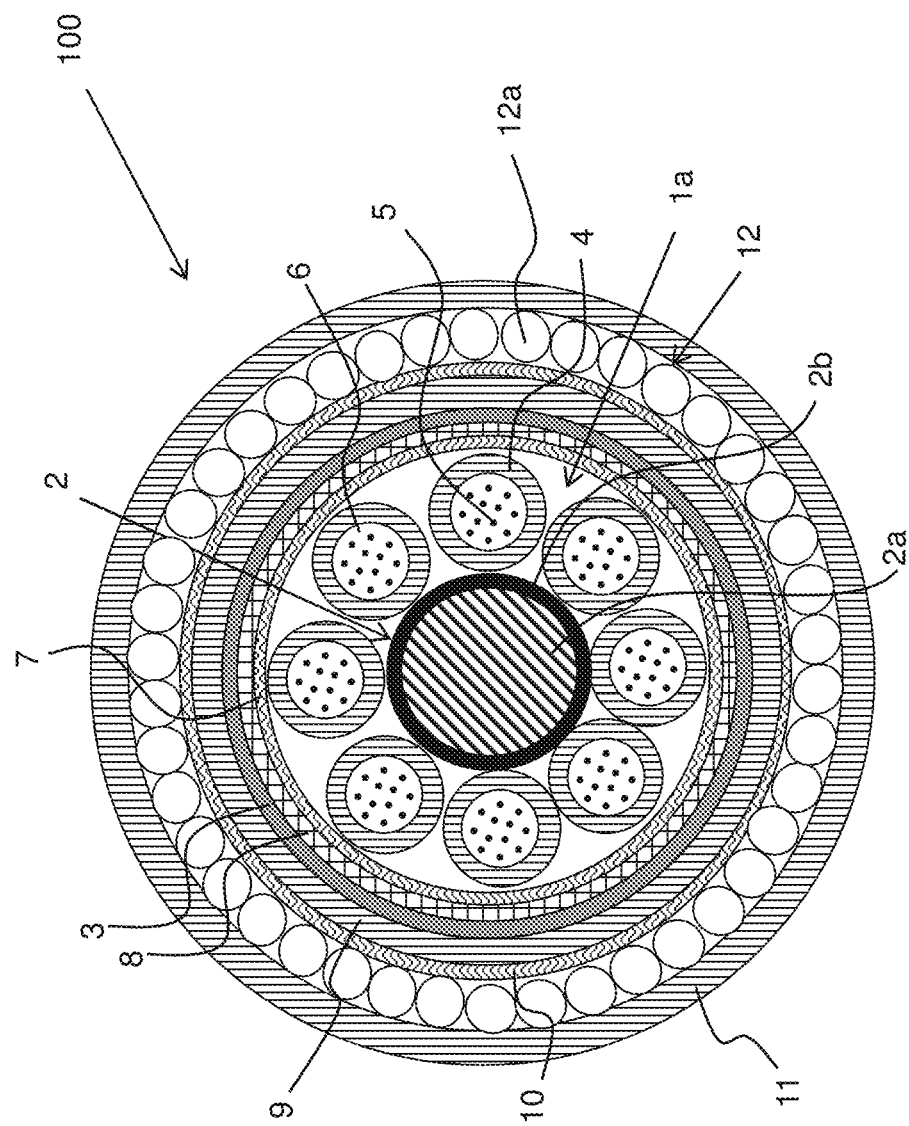
FIG. 1 shows a cross-section of a fire resistant fiber optic cable according to a first embodiment of the present disclosure.

The present disclosure relates to the field of optical cables suitable for operating during a fire and thereafter. In particular, the present disclosure relates to an armored fire resistant fiber optic cable.

The Applicant faced the problem of providing an armoured fiber optic cable capable of maintaining its performance not only during fire but also for a predetermined period of time after the fire is extinguished.

As shown in the above cited documents, the cable armor can be made of metal (typically steel) wires or corrugated tape. A flame retardant layers can be provided to surround the cable armor (as in US 2015/0131952 and WO 2015/200262) or flame retardant layers can be provided both in radially outer and inner position with respect to the cable armor (as in Fireflix brochure).

The Applicant experienced that in case of fire a cable armor made of metal wires provides lower attenuation in the optical fibers with respect to a cable armor made of corrugated metal tape, like that disclosed in US 2015/0131952 and WO 2015/200262. On the other side, a cable armor made of metal wires, even when provided with flame retardant layers both in radially outer and inner position, provides the cable with a worse fire resistance with respect to an armor made of corrugated metal tape.

The Applicant found that the provision of a mica layer between a metal wire armor and a flame retardant layer in radially inner position thereto provides suitable fire performance of the cable with the advantage of a lower optical fiber attenuation due to the presence of a metal wire armor.

Therefore, according to a first aspect, the present disclosure provides a fire resistant fiber optic cable comprising: a core comprising: a central strength member, and a plurality of buffer tubes arranged around the central strength member, each buffer tube containing a plurality of optical fibers; a first mica layer arranged around the core; an inner sheath surrounding the first mica layer; a metal wire armor-surrounding the inner sheath; and a metal wire armor surrounding the inner sheath, wherein a second mica layer surrounds the inner sheath and the metal wire armor surrounds the second mica layer.

In an embodiment, the fiber optic cable of the present disclosure comprises at least twenty-four (24) optical fibers. In another embodiment, the fiber optic cable comprises more than seventy-two (72) optical fibers. The fiber optic cable can contain up to 144 optical fibers.

The Applicant has also faced the problem of providing a fiber optic cable with high fiber count (i.e. housing more than seventy-two optical fibers) capable of maintaining its performance not only during fire but also for a predetermined period of time after the fire is extinguished.

Optical fibers have a coefficient of thermal expansion lower than that of the polymeric buffer tubes housing them. During the cooling after fire, the buffer tube shrinkage can mechanically stress the optical fibers up to breakage. As a result, the cable functionality, which was maintained during fire, may be impaired and the signal attenuated or even interrupted.

The Applicant experienced that damages to the optical fiber after fire was reduced by providing a silicone gel as water-blocking material inside the buffer tubes, said silicone gel having a drop point higher than 200° C.

Silicone is generally a very stable polymer, a great deal of this stability deriving from reversible hydrolysis reactions occurring under heating such that the polymer essentially heals itself. Applicant observed that a silicone gel surrounding the optical fibers during and after fire could provide some protection against mechanical stress.

Accordingly, the cable of the present disclosure may further comprise buffer tubes containing a water-blocking filling material comprising a silicone gel, wherein said silicone gel has a drop point of at least 200° C.

In an embodiment, the silicone gel as water-blocking material is a polyorganosiloxane, for example dimethylsiloxane, dimethyl-methylphenyl siloxane, methyl-phenylsiloxane.

In an embodiment, the silicone gel as water-blocking material has a drop point≥250° C.

The number buffer tubes in a cable and the number of optical fibers contained in each buffer tube may vary according to cable specification or customer request. For example, each buffer tube may contain from 5 to 12 optical fibers.

In some embodiments, the central strength member comprises a body of reinforced dielectric material. In an alternative embodiment, the central strength member comprises a body of metallic material, such as steel.

Aiming at a further reduction of optical fiber breakage after fire, the Applicant found that a LSoH hydroxide-containing flame retardant material in radially inner position with respect to the arrangement of buffer tubes housing the optical fibers enables a further reduction or even avoidance of said optical fiber breakage.

Hydroxides like magnesium hydroxide and aluminum hydroxide are used as flame retardant fillers because of their capability of releasing water during fire. Without wishing being bound to any theory, the Applicant conjectured that the hydroxide contained in a flame retardant material in radial inner position with respect to the buffer tubes, though not directly reached by the flame, was anyway subjected to a temperature triggering the release of an amount of water suitable for lowering the heat the buffer tubes. Accordingly, the buffer tube polymeric material underwent a lower thermal expansion which the silicone gel water-blocking material was able to fully compensate during cooling after fire with limited stress to the optical fiber.

In addition, the presence of hydroxide-containing flame retardant material in radial inner position with respect to the buffer tubes allows using a single fire barrier surrounding all of the buffer tubes together, rather than other arrangements such as a fire barrier around each single tube, allowing a saving of material for the fire barrier and a manufacturing process simplification.

Accordingly, the cable of the present disclosure may have a central strength member comprising a hydroxide-containing flame retardant polymeric material.

In an embodiment, the hydroxide-containing flame retardant polymeric material is embedded in the body material of the central strength member. In another embodiment, the hydroxide-containing flame retardant polymeric material of the central strength member is in the form of a layer applied over the body material of the central strength member.

In an embodiment, the hydroxide-containing flame retardant polymeric material of the central strength member has a limiting oxygen index (LOI)≤35%.

In an embodiment, the hydroxide-containing flame retardant polymeric material of the central strength member is a low smoke zero halogen material (LSoH or LSZH), a.k.a. halogen-free flame retardant material (HFFR). Flame retardant LSoH materials do not release toxic fumes.

In the present description and claims, as "hydroxide-containing flame retardant polymeric material" it is meant a polymeric material containing an inorganic flame-retardant filler selected from: metal hydroxides, hydrated metal oxides, metal salts having at least one hydroxyl group, and hydrated metal salts, said filler being capable of releasing water when heated.

In an embodiment, the hydroxide-containing flame retardant polymeric material of the central strength member comprises a flame-retardant filler selected from aluminum or magnesium hydroxide, aluminum or magnesium hydrated oxide, aluminum or magnesium salt having at least one hydroxyl group or aluminum or magnesium hydrated salt.

In an embodiment, the hydroxide-containing flame retardant polymeric material of the central strength member comprises magnesium hydroxide, alumina trihydrate or hydrated magnesium carbonate. In another embodiment, the hydroxide-containing flame retardant polymeric material of the central strength member comprises magnesium hydroxide.

Magnesium hydroxide is characterized by a decomposition temperature of about 340° C. and thus allows high extrusion temperatures to be used. The magnesium hydroxide of the present disclosure can be of synthetic or natural origin, the latter being, obtained by grinding minerals based on magnesium hydroxide, such as brucite or the like, as described, for example, in WO2007/049090.

The flame-retardant filler can be used in the form of particles which are untreated or surface-treated with saturated or unsaturated fatty acids containing from 8 to 24 carbon atoms, or metal salts thereof, such as, for example: oleic acid, palmitic acid, stearic acid, isostearic acid, lauric acid; magnesium or zinc stearate or oleate; and the like. In order to increase the compatibility with the polymer material, the flame-retardant filler can likewise be surface-treated with suitable coupling agents, for example short chain organic silanes or titanates such as vinyltriethoxysilane, vinyltriacetylsilane, tetraisopropyl titanate, tetra-n-butyl titanate and the like.

In an embodiment, the hydroxide-containing LSoH flame retardant polymeric material of the central strength member comprises a polymer selected from: polyethylene; copolymers of ethylene with at least one α-olefin containing from 3 to 12 carbon atoms, and optionally with at least one diene containing from 4 to 20 carbon atoms; polypropylene; thermoplastic copolymers of propylene with ethylene and/or at least one α-olefin containing from 4 to 12 carbon atoms; copolymers of ethylene with at least one ester selected from alkyl acrylates, alkyl methacrylates and vinyl carboxylates, wherein the alkyl and the carboxylic groups comprised therein are linear or branched, and wherein the linear or branched alkyl group may contain from 1 to 8, preferably from 1 to 4, carbon atoms, while the linear or branched carboxylic group may contain from 2 to 8, preferably from 2 to 5, carbon atoms; and mixtures thereof.

With "α-olefin" it is generally meant an olefin of formula $CH_2=CH-R$, wherein R is a linear or branched alkyl having from 1 to 10 carbon atoms. The α-olefin can be selected, for example, from propylene, 1-butene, 1-pentene, 4-methyl-1-pentene, 1-hexene, 1-octene, 1-dodecene and the like. Among them, propylene, 1-butene, 1-hexene and 1-octene are particularly preferred.

Examples of polymer that may be used in the flame retardant LSoH polymeric material for the central strength member of the present disclosure are: high-density polyethylene (HDPE) (d=0.940-0.970 g/cm3), medium-density polyethylene (MDPE) (d=0.926-0.940 g/cm3), low-density polyethylene (LDPE) (d=0.910-0.926 g/cm3); linear low-density polyethylene (LLDPE) and very-low-density polyethylene (VLDPE) (d=0.860-0.910 g/cm3); polypropylene (PP); thermoplastic copolymers of propylene with ethylene; ethylene/vinyl acetate (EVA) copolymers; ethylene/ethyl acrylate (EEA) copolymers, ethylene/butyl acrylate (EBA) copolymers; ethylene/α-olefin rubbers, in particular ethylene/propylene rubbers (EPR), ethylene/propylene/diene rubbers (EPDM); and mixtures thereof.

In an embodiment, the first mica layer comprises one or two mica tapes. The mica tape/s is/are wound around the core comprising the central strength member and the buffer tubes. When two mica tapes are present, they can be wound in the same direction.

In an embodiment, one or more water swellable tapes may be present in the present cable. A water swellable tape can be interposed between the cable core and the first mica layer and/or between the second mica layer and the armour.

In an embodiment, a water barrier can be provided between the first mica layer and the inner sheath. The water barrier can be made of a water swellable tape and/or aluminum tape optionally having one side or both sides covered by a polymer layer.

In an embodiment, the second mica layer comprises one or two mica tapes. The mica tape/s is/are wound around the inner sheath. When two mica tapes are present, they can be wound in the same direction.

In an embodiment, the second mica layer surrounds and is in direct contact with the inner sheath.

In an embodiment, the first mica layer and/or with the second mica layer are surrounded with a relevant protecting layer (in form of, for example, a polyester tape) in direct contact thereto. The presence of this protecting layer could improve the flame performance of cable.

The metal wire armor of the cable of the disclosure can be made of any material suitable for providing the cable core with protection against external stress, in particular against compressive forces and to make the cable rodent-proof. In an embodiment, the wire armor is at least partially made of a metal such as aluminum or steel. In particular, the wire armor can be in form of a plurality of armor wires arranged in a single armor layer or in two armor layers (inner and outer armor layer). The armor wires are wound around the core according to a winding lay. In an embodiment, the armor wires have a diameter of from 0.9 mm to 3 mm.

In an embodiment, the inner sheath and/or the outer sheath are made of a flame retardant LSoH polymeric material. In an embodiment this material has a limiting oxygen index (LOI) 30%, for example 40%. In an embodiment, the flame retardant LSoH polymer-based material of the inner sheath and/or of the outer sheath can have a LOI s 70%, for example preferably s 60%. In an embodiment, the inner sheath and the outer sheath are made of the same LSoH flame-retardant polymeric material.

In another embodiment the LSoH flame-retardant polymeric material of the inner sheath has a LOI higher than that of the outer sheath material.

The polymer material of the inner and the outer sheath can be selected from the list already given in connection with the hydroxide-containing flame retardant material of the central strength member. The same applies for the inorganic-flame retardant filler contained therein.

In further embodiment, the buffer tubes are made of a polymer base mixed with inorganic-flame retardant filler/s, too.

In an embodiment, the amount of the flame-retardant filler in any flame retardant LSoH polymeric material for the cable of the present disclosure is lower than 500 phr, preferably from 130 phr to 300 phr.

Within the present description and the claims, the term "phr" (acronym of "parts per hundred of rubbers") is used to indicate parts by weight per 100 parts by weight of the polymer base material.

For the purpose of the present description and of the appended claims, except where otherwise indicated, all numbers expressing amounts, quantities, percentages and so forth, are to be understood as being modified in all instances by the term "about". Also, all ranges include any combination of the maximum and minimum points disclosed and include any intermediate ranges therein, which may or may not be specifically enumerated herein.

For the purpose of the present description and claims, an optical fiber comprises a core surrounded by a cladding, said core and cladding being preferably made of glass, and one or two protecting coatings based, for example, on acrylate material.

For the purpose of the present description and claims, as "limiting oxygen index" (LOI) it is meant the minimum concentration of oxygen, expressed as a percentage, that will support combustion of a polymer. Higher values of LOI indicate greater fire retardancy. LOI values are determined by standards, such as ASTM D2863-12 (2012).

The minimum concentration of oxygen, expressed as a percentage that will support combustion of a polymer. Higher values of LOI indicate greater fire retardancy. LOI values are determined by standards, such as ASTM D2863-12 (2012). The minimum concentration of oxygen, expressed as a percentage, that will support combustion of a polymer. Higher values of LOI indicate greater fire retardancy. LOI values are determined by standards, such as ASTM D2863-12 (2012).

For the purpose of the present description and appended claims, drop point is a numerical value assigned to a grease composition representing the temperature at which the first drop of material falls from a test cup. Drop point can be measured under the conditions set forth in ASTM D566-02 (2002).

In FIG. 1, the fiber optic cable is indicated by reference number 100.

Cable 100 comprises a core 1a. The core 1a, in turn, comprises a central strength member 2 and a plurality of buffer tubes 4, each comprising a plurality of optical fibers 5.

The central strength member 2 is an elongated member and it can have a circular or substantially circular cross-section. In the present embodiment, the central strength member comprises a body 2a of reinforced dielectric material, for example glass reinforced plastic (GRP), fiber reinforced plastic (FRP) or any other similar material.

The body 2a is covered by a coating 2b made of hydroxide-containing flame retardant LSoH polymeric material. Preferably, the material of the coating 2b contains magnesium hydroxide in an amount of about 130 phr. This material can have a LOI of 28%.

A number of buffer tubes 4 are arranged radially outer with respect to the central strength member 2. In an embodiment, the buffer tubes 4 are stranded around the central strength member 2 in S-Z configuration.

In the embodiment of FIG. 1, eight buffer tubes 4 are provided around the central strength member 2. However, there could be more or less tubes in other embodiments.

The buffer tubes 4 can be made of any suitable polymeric material, for example polybutylene terephthalate (PBT). In an embodiment, the buffer tubes can be made of a hydroxide-containing flame retardant LSoH polymeric material.

Each buffer tube 4 contains a plurality of optical fibers. In an embodiment, each buffer tube 4 contains 12 optical fibers.

Each buffer tube 4 may contain water-blocking filling material 6 comprising a silicone gel with a drop point of at least 200° C.

For example, materials suitable as water-blocking filling for the cable of the present disclosure are polyorganosiloxane marketed as Rhodorsil® by Rhodia Siliconi Italia S.p.A., Italy.

It should be remarked that each single buffer tube 4 is not individually protected by fire resistant materials, for example mica tapes.

The core 1a comprising buffer tubes 4 and central strength member 2 is wrapped by a first mica layer 7.

In an embodiment, the first mica layer 7 comprises two mica tapes. Mica, for example in form of flakes, may be bonded to a backing layer using a binding agent, such as silicone resin or elastomer, acrylic resin and/or epoxy resin. The backing layer may be formed of a supporting fabric, such as woven glass and/or glass cloth.

In an embodiment, each mica tape of the layer 7 is wound with an overlapping. The overlapping can be higher than 40% and preferably of 50%.

In radial external position and in direct contact with the first mica layer 7 a protecting layer 8 is preferably provided. For example, the protecting layer 8 is a polyester tape.

In radial external position to the protecting layer 8 a water barrier 3 is preferably provided. In the present embodiment, the water barrier 3 is made of aluminum tape coated on both sides by a polymer layer.

Another water barrier (not illustrated), which is dielectric and made of water swellable material (for example a tape) may surrounds the core 1a in a radial internal position with respect to the first mica layer 7.

In radial external position and in direct contact with the water barrier 3 an inner sheath 9 is provided. The inner sheath 9 can be extruded directly on the water barrier 3.

The inner sheath 9 can have a thickness between 1 and 3 mm. In one embodiment such thickness is of 1.5 mm.

Preferably, the inner sheath 9 is made of a flame retardant LSoH polymer material. The material of the inner sheath 9 preferably contains magnesium hydroxide in an amount of about 200 phr. This material can have a LOI of 37%.

In radially outer position with respect to the inner sheath 9 a second mica layer 10 is provided. The second mica layer 10 may comprise two mica tapes similar to those use for the first mica layer 7. In an embodiment, each mica tape of the second mica layer 10 is wound with an overlapping. The overlapping can be higher than 40% and preferably of 50%.

Figure 2:
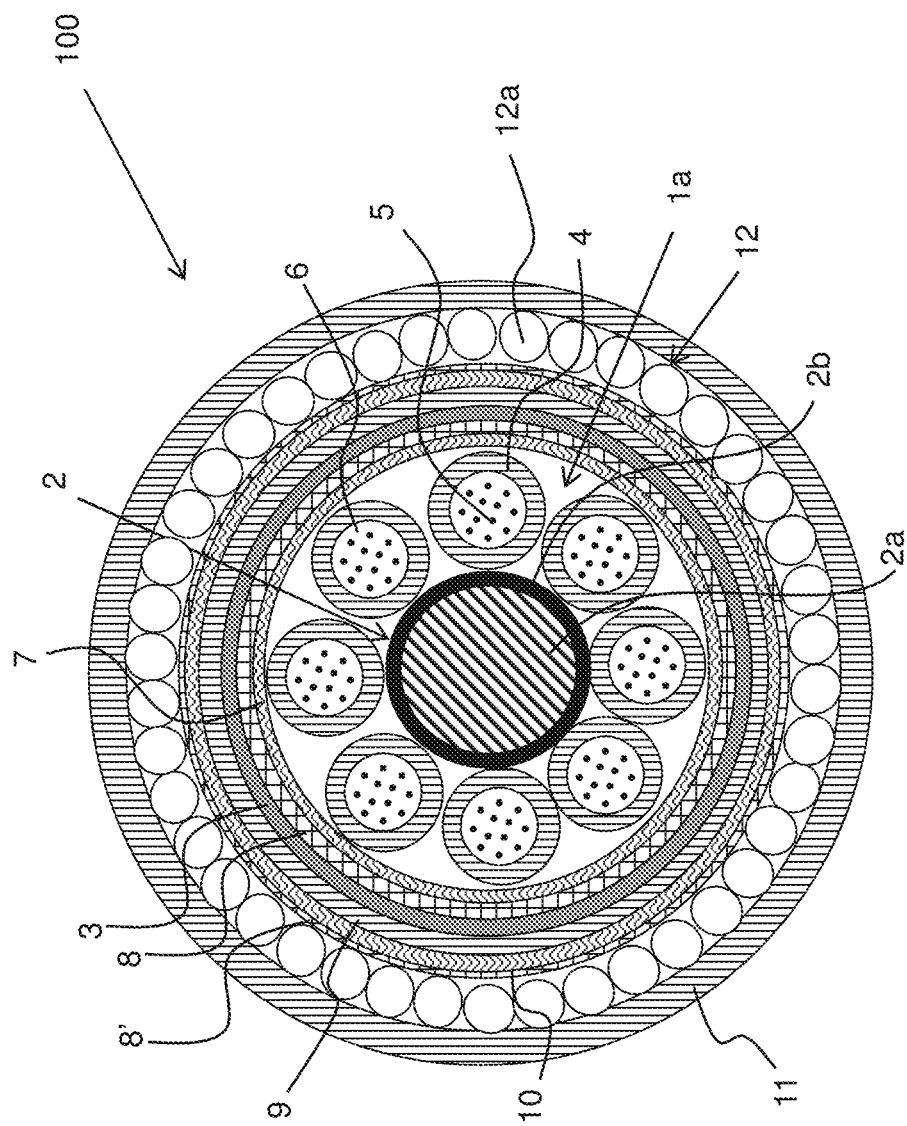
FIG. 2 shows a cross-section of a fire resistant fiber optic cable according to a second embodiment of the present disclosure.

According to the embodiment of FIG. 2 (where all the reference numbers have the same meaning as in FIG. 1), a further protecting layer 8', similar to the protecting layer 8, may surround and directly contact the second mica layer 10.

Another water barrier (not illustrated), which is dielectric and made of water swellable material (for example a tape) may surround the second mica layer 10 (and its protecting layer, if any) in a radial internal position with respect to the metal wire armor-12.

In radially outer position with respect to the second mica layer 10 a metal wire armor-12 is provided. In the present embodiment, metal wire armor-12 is made of a plurality of wires 12a wound around the cable core in a single layer. In the present embodiment, the wires 12a have a substantially circular cross-section with a diameter of 1.6 mm. In an embodiment, the wires 12a are made of steel optionally coated, for example by a zinc layer.

In a radially outer position to and in direct contact with the metal armor-12, an outer sheath 11 is provided. The outer sheath 11 can be extruded directly on the armor-12.

The outer sheath 11 can have a minimum thickness between 1 and 3 mm. In one embodiment such thickness is of 1.6 mm.

Preferably, outer sheath 11 is made of a flame retardant LSoH polymeric material. Preferably, the material of the inner sheath 11 contains magnesium hydroxide in an amount of about 200 phr. This material can have a LOI of 37%.

The cable 100 of FIG. 1 (comprising 96 optical fibers 5) has a nominal diameter of 24.8 mm. A cable with analogous construction but containing 72 or 144 optical fibers can have a nominal diameter of, respectively 23.4 mm or 27.9 mm.

EXAMPLE

The Applicant carried out fire-resistance tests on a cable according to the present disclosure and a comparative cable.

While the cable according to the present disclosure (Cable 1) has a steel wire armor as described in connection with FIG. 1, the comparative cable (Cable 2) had an armor-made of corrugated steel tape having a thickness of 0.15 mm. Tests and results are summarized in Table I All of the tested cables had a structure analogous to that of cable 100 of FIG. 1 and contained 144 fibers in 12 buffer tubes (12 fibers each tube). Their buffer tubes were filled with polydimethylsiloxane gel having a drop point greater than 250° C.; each central strength member made of FRP covered by a coating made of hydroxy-containing flame retardant LSoH polymeric material having a LOI of 28%; their inner and outer sheaths were made of the same flame retardant LSoH polymer-based material containing magnesium hydroxide and having a LOI of about 37%.

TABLE I

| Test | Threshold | Cable 1 | Cable 2* |
|---|---|---|---|
| Flame spread in a vertical single cable (IEC 60332-1-2, 2004) | max 540 mm | 475 mm | 485 mm |
| Flame spread in a bunched vertical cables (IEC 60332-3-24, 2000) | max 2500 mm | 880 mm | 800 mm |
| Smoke density (IEC 61034-2, 2005) | min 60% light transmission | 66.03% | 83.36% |
| Attenuation under fire (IEC 60331-25, 1999) | — | 0.08 dB | 0.33 dB |
| Attenuation after fire (15 min cooling) (IEC 60331-25, 1999) | — | 0.35 dB | 0.47 dB |

*comparative

Both the cable according to the disclosure (Cable 1) and the comparative 1 (Cable 2) passed the tests of flame spread and smoke density, but in the attenuation tests (signal transmittance during fire and for 15 minutes of cooling after fire extinction) Cable 1 showed a significantly lower signal attenuation which, in particular, is nearly negligible under fire, four times lower than that provided by Cable 2 under the same test condition.

The invention claimed is:

1. A fiber optic cable comprising:
a core comprising:
a central strength member, and
a plurality of buffer tubes arranged around the central strength member, each of the plurality of buffer tubes containing a plurality of optical fibers;
a first mica layer arranged around the core, portions of outer surfaces of the plurality of buffer tubes being in direct contact with an inner surface of the first mica layer;
a polyester layer surrounding, and in physical contact with, the first mica layer;
a water barrier layer surrounding, and in physical contact with, the polyester layer, wherein the water barrier layer comprises an aluminum tape;
an inner sheath surrounding the first mica layer;
a metal wire armor surrounding the inner sheath; and
an outer sheath surrounding and in direct contact with the metal wire armor,
wherein the outer sheath is extruded directly on the metal wire armor,
a second mica layer surrounding the inner sheath, the metal wire armor surrounding the second mica layer, wherein the fiber optic cable is a fire resistant fiber optic cable.

2. The fiber optic cable of claim 1, wherein the plurality of optical fibers comprise at least 24 optical fibers.

3. The fiber optic cable of claim 1, wherein the buffer tubes contain a water-blocking filling material comprising a silicone gel, wherein the silicone gel has a drop point of at least 200° C., and wherein the central strength member comprises a hydroxide-containing flame retardant polymeric material.

4. The fiber optic cable of claim 3, wherein the silicone gel has a drop point of that is greater than or equal to 250° C.

5. The fiber optic cable of claim 1, wherein the central strength member comprises a body and hydroxide-containing flame retardant polymeric material in form of a layer on an outer surface of the body.

6. The fiber optic cable of claim 3, wherein the hydroxide-containing flame retardant polymeric material of the central strength member is a low smoke zero halogen (LSoH) material.

7. The fiber optic cable of claim 3, wherein the hydroxide-containing flame retardant polymeric material of the central strength member has a limiting oxygen index (LOI) that is less than or equal to 35%.

8. The fiber optic cable of claim 1, wherein a polyester layer is provided around and in direct contact with the second mica layer.

9. The fiber optic cable of claim 1, wherein the inner sheath is made of a flame retardant low smoke zero halogen (LSoH) polymer-based material.

10. The fiber optic cable of claim 9, wherein the flame retardant LSoH polymer-based material has a limiting oxygen index (LOI) that is greater than or equal to 30%.

11. The fiber optic cable of claim 9, wherein the flame retardant LSoH polymer-based material has a limiting oxygen index (LOI) that is less than or equal to 70%.

12. The fiber optic cable of claim 9, wherein the inner sheath and the outer sheath are made of the same flame-retardant LSoH polymer-based material.

13. The fiber optic cable of claim 9, wherein the flame-retardant LSoH polymer-based material of the inner sheath has a limiting oxygen index (LOI) higher than the LOI of the material of the outer sheath.

14. A fiber optic cable comprising:
a central strength member comprising a hydroxide-containing flame retardant polymeric material;
a plurality of buffer tubes arranged around the central strength member, each of the plurality of buffer tubes comprising a plurality of optical fibers, the buffer tubes containing a water-blocking filling material comprising a silicone gel, and the silicone gel having a drop point of at least 200° C.;
a first mica layer disposed over the central strength member, the plurality of buffer tubes being disposed in an annular region between the first mica layer and the central strength member, portions of outer surfaces of the plurality of buffer tubes being in direct contact with an inner surface of the first mica layer;
a first protecting polyester layer surrounding, and in physical contact with, the first mica layer;
a water barrier layer surrounding, and in physical contact with, the polyester layer, wherein the water barrier layer comprises an aluminum tape;
a first sheath surrounding the water barrier layer;
a second mica layer surrounding the first sheath;
a metal wire armor surrounding the second mica layer; and
a second sheath surrounding and in physical contact with the metal wire armor, wherein the second sheath is extruded directly on the metal wire armor, wherein the fiber optic cable is a fire resistant fiber optic cable.

15. The fiber optic cable of claim 14, wherein the silicone gel has a drop point that is greater than or equal to 250° C.

16. The fiber optic cable of claim 14, wherein the aluminum tape is coated on both sides by a polymer layer.

17. The fiber optic cable of claim 14, further comprising a second protecting polyester layer surrounding and in direct contact with the second mica layer, the second protecting polyester layer disposed between the second mica layer and the metal wire armor.

18. A fiber optic cable essentially consisting of:
- a core comprising:
  - a central strength member, and
  - a plurality of buffer tubes arranged around the central strength member, each of the plurality of buffer tubes containing a plurality of optical fibers;
- a first mica layer arranged around the core, portions of outer surfaces of the plurality of buffer tubes being in direct contact with an inner surface of the first mica layer;
- a polyester layer surrounding, and in physical contact with, the first mica layer;
- a water barrier layer surrounding, and in physical contact with, the polyester layer;
- an inner sheath surrounding, and in physical contact with, the water barrier layer;
- a second mica layer surrounding the inner sheath;
- a metal wire armor surrounding the second mica layer; and
- an outer sheath surrounding and in direct contact with the metal wire armor, wherein the fiber optic cable is a fire resistant fiber optic cable.

19. The fiber optic cable of claim 14, wherein the hydroxide-containing flame retardant polymeric material of the central strength member is a low smoke zero halogen (LSoH) material.

20. The fiber optic cable of claim 14, wherein the hydroxide-containing flame retardant polymeric material of the central strength member has a limiting oxygen index (LOI) that is less than or equal to 35%.

21. The fiber optic cable of claim 1, wherein the metal wire armor comprises armor wires having a diameter of from 0.9 mm to 3 mm.

22. The fiber optic cable of claim 14, wherein the metal wire armor comprises armor wires having a diameter of from 0.9 mm to 3 mm.

23. The fiber optic cable of claim 18, wherein the buffer tubes contain a water-blocking filling material comprising a silicone gel, wherein the silicone gel has a drop point of at least 200° C., and wherein the central strength member comprises a hydroxide-containing flame retardant polymeric material.

* * * * *